Feb. 10, 1970     R. J. TEETER ET AL     3,494,798
CASE FOR STORAGE BATTERY
Filed Dec. 18, 1967     3 Sheets-Sheet 3

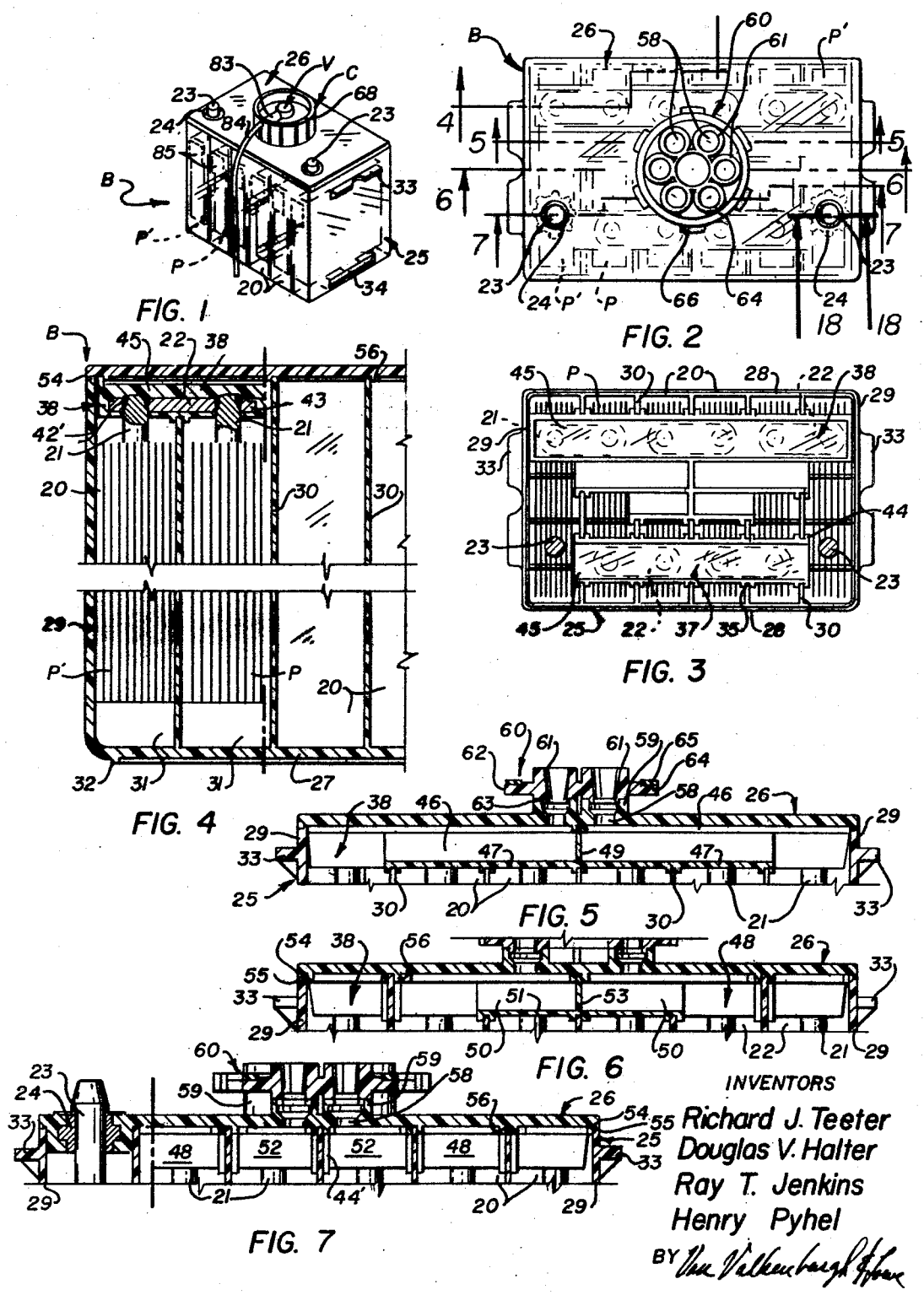

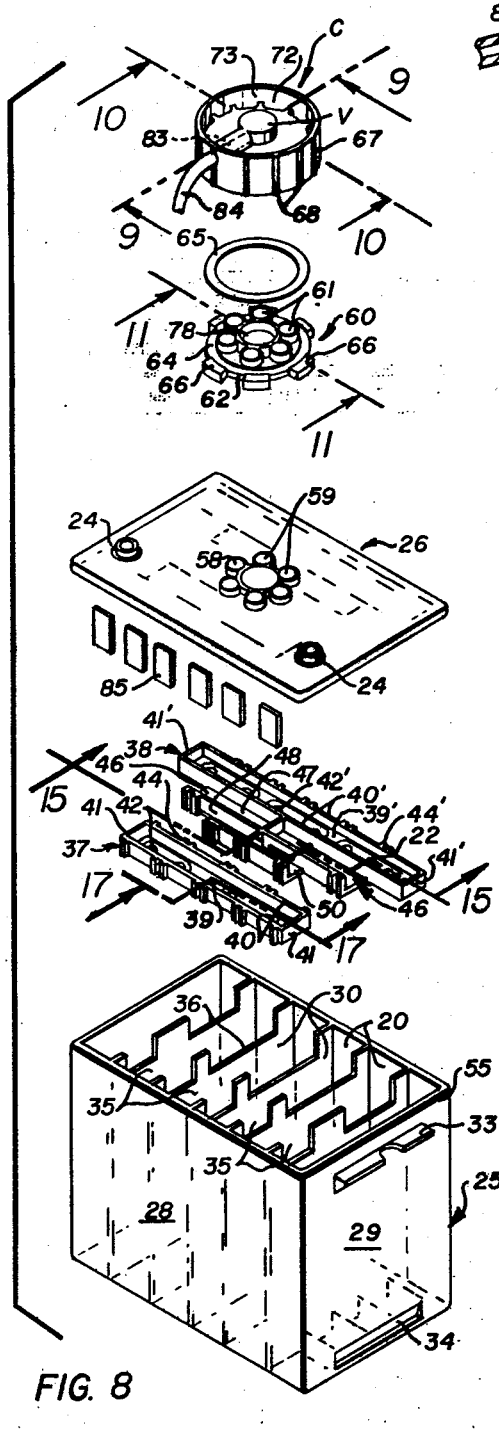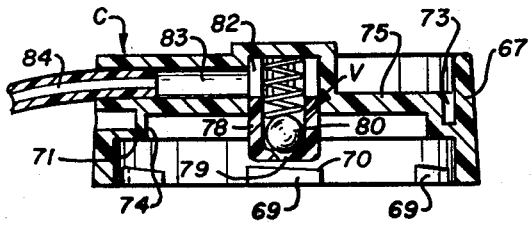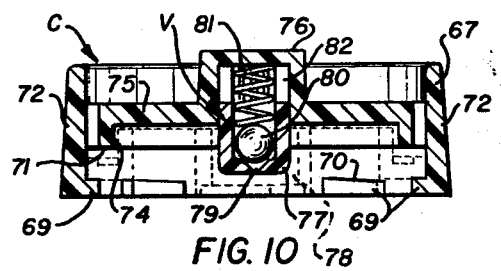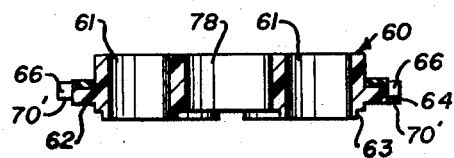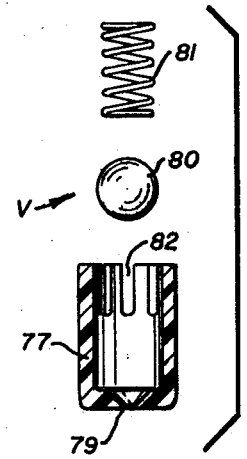

INVENTORS
Richard J. Teeter
Douglas V. Halter
Ray T. Jenkins
Henry Pyhel

BY *Van Valkenburgh & Lowe*

ATTORNEYS

United States Patent Office 3,494,798
Patented Feb. 10, 1970

3,494,798
CASE FOR STORAGE BATTERY
Richard J. Teeter, Windsor, and Douglas V. Halter, Loveland, Colo., and Ray T. Jenkins, Kansas City, and Henry Pyhel, Kirkwood, Mo., assignors to First National Bank as Trustee, Windsor, Colo.
Filed Dec. 18, 1967, Ser. No. 691,266
Int. Cl. H01m 1/02
U.S. Cl. 136—134                              15 Claims

ABSTRACT OF THE DISCLOSURE

The disclosure herein is to a wet-cell storage battery wherein the case is formed of a transparent, synthetic resin. The use of the transparent resin facilitates an arrangement wherein the cell outlets are channeled to a central point to be closed by a single cap and further to permit this closure to be resistant to moderate pressure. The channels so formed may be mounted in notched inserts across the partition tops between the cells. This arrangement may also include channel or box-like components to carry the bus bar connectors from one cell to another in an enhanced structurally rigid arrangement. The use of transparent cells can permit installation of simple floats within a battery cell, to indicate whether or not the cell is charged by mere visual inspection of the float.

---

This invention relates to improvements in wet-cell, storage batteries, and more particularly to improvements in the construction of the encasement structure for lead-acid type batteries commonly used to provide a six-volt or twelve-volt source of power for starting automobile motors and the like. As such, the invention will be hereinafter called a "case for a storage battery" and sometimes also simply as a "storage battery."

An object of the invention is to provide a novel and improved case for a storage battery, which more effectively houses the plate groups within their respective cells against bumping and jarring and other abuses to which the battery may be subjected when it is being used.

Another object of the invention is to provide a novel and improved case for a storage battery, wherein the outlet from each cell is directed to a common, central head, so that all of the outlets are closed by a single pressured cap, which minimizes evaporation from the cells and permits the use of a single vent line, to prevent the accumulation of acid upon the body of the battery, especially at the terminals thereof, and avoid adverse corrosion effects upon the cables and the structure holding the battery.

Another object of the invention is to provide a novel and improved case for a storage battery wherein the outlet from each cell extends as an individual channel or passageway to a common head at the top of the battery, to permit each cell to be filled with water and cared for in an ordinary manner.

Another object of the invention is to provide a novel and improved case for a battery which is formed of a transparent, synthetic plastic resin which permits visual inspection of each cell to ascertain the amount of water in the cell and to note its general condition, to permit the use of a simple charge indicator within each cell for an instant check of the charge of the cell, and permit the use of a single closure at the top of the battery instead of individual closures for each of the cells.

Another object of the invention is to provide, in combination with a storage battery, embodying a transparent case, a novel and improved indicator in each cell of a very simple construction to ascertain the charge of the cell by visual inspection.

Another object of the invention is to provide a novel and improved case for a storage battery which includes a simplified encapsulating arrangement for containing the bar connectors between the plate groups within the individual cells, to better prevent these bars from being attacked by acid and eliminate the possibility of leakage between the cells at these connectors.

Another object of the invention is to provide a novel and improved case for a wet-cell storage battery formed of a minimum number of individual components, arranged in a manner which permits the use of a selected, transparent, thermoplastic synthetic resin components for quick and efficient assembly to a finished battery.

Another object of the invention is to provide a novel and improved case construction for a wet-cell storage battery which has its components advantageously arranged to render the use of transparent synthetic resin materials for battery cases economical and practical.

Other objects of the invention are to provide a novel and improved case for a wet-cell battery of transparent plastic materials which is of an economical, high quality, neat appearing, rugged and durable construction.

With the foregoing and other objects in view, all as will hereinafter appear, our invention comprises certain constructions, combinations and arrangements of parts and elements as hereinafter described, defined in the appended claims and illustrated in the accompanying drawing, in which:

FIGURE 1 is a small scale isometric view of a completed battery constructed according to the present invention, and with broken lines indicating elements within the battery and seen through the transparent lid and walls of the battery case.

FIGURE 2 is a plan view of the battery on an enlarged scale, with its top cap removed to better show the cell outlets, and with broken lines indicating some elements within the battery which may be seen through the transparent lid of the battery.

FIGURE 3 is a plan view similar to FIG. 2, but with the top cover of the battery removed to better show components within the battery.

FIGURE 4 is a fragmentary, longitudinal sectional view as taken from the indicated line 4—4 at FIG. 2, but on an enlarged scale and with portions being broken away to conserve space.

FIGURES 5, 6 and 7 are longitudinal sectional views of the upper portion of the battery, as taken from the respective indicated lines 5—5, 6—6 and 7—7 at FIG. 2, but on an enlarged scale.

FIGURE 8 is an exploded isometric view looking down upon the several components forming the battery case.

FIGURE 9 is a transverse sectional view through the battery cap as taken from the indicated line 9—9 at FIG. 8, but on an enlarged scale.

FIGURE 10 is a longitudinal sectional view through the cap as taken from the indicated line 10—10 at FIG. 8, but on an enlarged scale.

FIGURE 11 is a longitudinal sectional view through the inlet head as taken from the indicated line 11—11 at FIG. 8, but on an enlarged scale.

FIGURE 12 is an exploded view of valve components within the battery cap as shown in FIGS. 9 and 10, but with said components being on a further enlarged scale.

Figure 13:
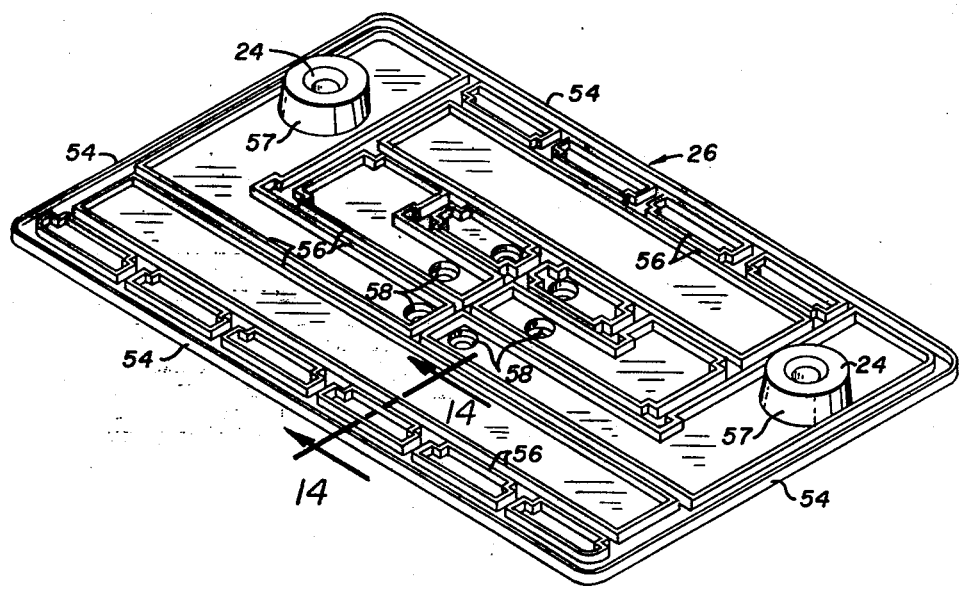

FIGURE 13 is an isometric view of the underside of the lid of the battery, but on an enlarged scale compared with the showing of the topside of the lid element at FIG. 8.

Figure 14:

FIGURE 14 is a fragmentary sectional detail as taken from the indicated line 14—14 at FIG. 13, but on an enlarged scale.

Figure 15:
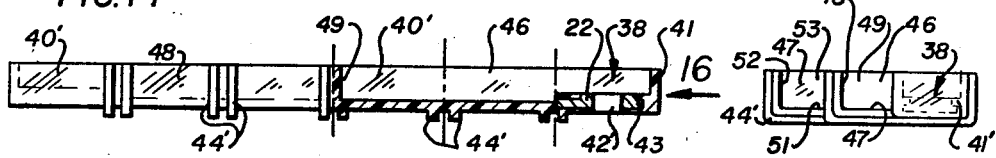

FIGURE 15 is a longitudinal edge and sectional view of one box channel element within the battery, as taken from the indicated line 15—15 at FIG. 8, but on an enlarged scale.

Figure 16:
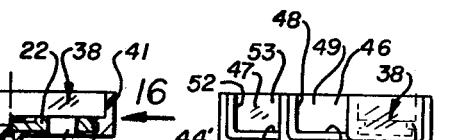

FIGURE 16 is an end view of the box element, as from the indicated arrow 16 at FIG. 15.

Figure 17:
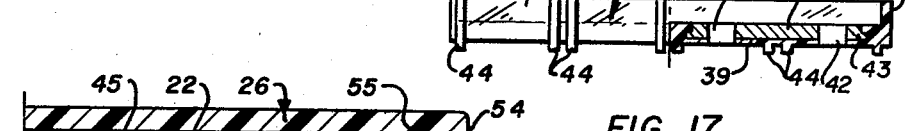

FIGURE 17 is a longitudinal edge and sectional view of a second box element within the battery, as taken from the indicated line 17—17 at FIG. 8, but on an enlarged scale.

Figure 18:
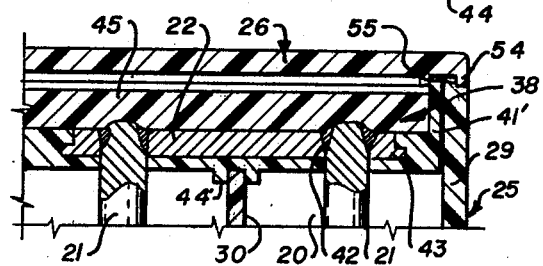

FIGURE 18 is a fragmentary transverse sectional view, as taken from the indicated line 18—18 at FIG. 2, but on a greatly enlarged scale to further illustrate the mode of interconnecting and encasing certain components when assembling the battery.

The present invention was conceived and developed to meet the constant and growing demand for better storage batteries, especially for commercial vehicles where continuous starts and stops impose a substantial load upon the batteries. Also, there is a need for better storage batteries which are used for the prime energy source for driving vehicles, such as golf carts, and, as will eventually develop, for driving other types of vehicles. Insofar as lead-acid type batteries are concerned, the plate arrays within the cells have been developed to the point where they will stand up under substantial working loads, overloads and will withstand considerable physical abuse, such as that which comes about from striking and shaking the batteries. However, there is a need for a better battery case to provide for an improved mode of inspection and an improved mode of maintaining and protecting the components therein.

One serious problem resides in the fact that the loss of water in one or more of the cells can damage and even ruin an otherwise good battery. This water loss, which may occur through evaporation when the battery is heated, can easily be unnoticed in conventional batteries. Another problem resides in the fact that conventional batteries will invariably leak and spill, or engender the migration of acid over their tops to corrode connector cables and metal parts of the structure whereon the battery is mounted.

The improved battery case constituting the present invention is best formed of a transparent, synthetic plastic resin which will eliminate to a substantial extent the problems arising out of the loss of water in the battery cells, for all that will be required is an occasional glance at the battery, to ascertain the water level in each cell and also its general condition. Heretofore, transparent battery cases have been proposed and are used in small types of wet-cell batteries, but the use of such transparent battery cases has not become more widespread because of design and economic problems relating primarily to the development of a properly constructed case.

In the present invention, the more desirable features of conventional battery cases are combined with other novel features to better retain the plates within the battery cells. The transparent construction permits the use of a single, central inlet head which is closed by a single, valved cap adapted to permit fumes to be ejected from the battery but to prevent loss of liquids therefrom. Also, the connector bars joining the posts of the several plate arrays within the cells are encased within boxed channels to most effectively protect them from deterioration by the acid within the battery.

Referring to FIG. 1 of the drawing, the improved battery B is proportioned to be of the same size as a conventional battery, of the same capacity and rating, so that it may be easily interchangeable with and can replace a conventional battery which has been worn out. This improved battery B, illustrated in detail in FIGS. 2 through 7, has regular plate assemblies P within the several cells 20 of the case. Each plate assembly P includes positive and negative intermediate posts 21 which are interconnected and operatively interlocked by bus bar members 22. Also, a terminal post 23 upstands from the outer plate assembly P′ to extend through anchor lugs 24 in the top of the battery to form the conventional positive and negative connective terminals 23.

The case forming the battery B, which includes the body 25, a lid 26 and other structural components associated with the body and lid, as will be described, are formed of a tough, impact resistant, acid resistant, thermoplastic synthetic resin which is preferably transparent. One suitable plastic material for such a battery is modified acrylic plastic, such as Acrylite M.P., furnished by American Cyanimid Company. This plastic, or any one of several other types having similar physical properties, can be easily formed in the several case components in an injection mold. Accordingly, the body, lid and other components are advantageously arranged for manufacture by injection molding, with wall portions, surfaces and offsets having suitable tapers to facilitate drawing the items from the molds after they are formed. It is to be noted that, in the manufacture of a battery by injection molding of a selected plastic material, many of the small, but necessary, details of construction can be easily integrated into a minimum number of individual components, and these components can be then arranged to nest together into a compact, sturdy unit. They may then be welded together by a suitable solvent or adhesive material, such as tetra hydra furan.

The body 25 is formed generally as an open, box-like container having a flat bottom 27. Opposing side walls 28 and opposing end walls 29 upstand from the respective side and end edges of this bottom to interconnect at the four corners thereof. The edges and corners joining the bottom, side and end walls are all suitably rounded, as illustrated at FIG. 4, to minimize marring and denting in accordance with good construction practice.

A 12-volt battery is illustrated in the drawing, and accordingly, the case is formed into six cells 20 by transversely disposed dividing partitions 30 which will be suitably tapered from a maximum width at the base and to a lesser width at the top edge to facilitate withdrawal of the body from its forming die. It is to be noted that, aside from notched portions in the partitions, hereinafter described, the top rim edges of the side and end walls and the top edges of these partitions 30 lie flush in a common plane to facilitate the final closure of the battery body by the lid 26.

Several other features complete this case body 25. A plurality of longitudinally disposed baffles 31 are formed at the bottom of each transverse cell at suitable spacings to support plate assemblies which are mounted within each cell in the manner shown at FIG. 4. The baffles are conventional and provide a space for the accumulation of waste which sluffs from the plate assemblies when the battery is in use. The bottom of the battery includes a support rim 32 about its edge, a handle 33 formed near the top of each end wall 29 and a holddown ledge 34 formed near the base of each end wall.

A first longitudinally disposed row of rectangular notches 35 is formed at one side of the partitions 30 and a second, wider, row of notches 36 is formed at the other side of the partitions. The notch rows hold elongated connector boxes and passageway channels, as will now be described.

The other components which join the body 25 to make up the battery are now described in an order in which they may be assembled, and the first step in such assembly is to place the plate assemblies P and P′ in their proper cells 20, such being a conventional step in the assembly of storage batteries. In the 12-volt, six-cell battery illustrated, four intermediate posts 21 and the two terminal posts 23 are positioned at one side of the battery, at the side of the notches 35, and six intermediate posts 21 are positioned at the other side. Accordingly, two bar connectors 22, in longitudinal alignment, will join the four intermediate posts 21 at the first-mentioned side of the battery and three bar connectors 22, in a longitudinal alignment, will join the six posts at the other side. These bars 22 are mounted in elongated, narrow boxes 37 and 38, respectively.

The box 37, the shorter of the two, has a thick floor structure 39 and thinner sidewalls 40 and ends 41. Each of the metal connectors 22, formed as short bars with rounded ends and with a hole 42 in each end to receive the posts 21, is embedded in the floor 39 to expose only its top surface at the floor surface within the box. To better secure each connector bar 22 in position in this floor, a short flange 43 extends about the lower portion of its edge. The connector bars 22 are molded in place in the plastic forming die of the box 32 and the forming die spaces the holes 42 in position along the box for proper fitting of the posts 21 and also continues the holes through the plastic floor structure of the box 37 below the connectors, as best illustrated at FIG. 17.

This box is proportioned to lie in the notched row 35 with its top edge flush with the top surface plane of the body 25. Transverse rims 44 at each end and as intermediate, closely spaced pairs extend about the outside of the walls 40 and the underside of the floor 39 to form flanges and grooves slots which embrace the sides of the partition walls 30 about the notches 35. Accordingly, in assembly of this portion of the battery, the box 37 may be dropped into position in the notched row 35 with posts 21 of the previously set plates extending through the holes 42. At the same time, the box is welded into the notches 35 with a suitable adhesive or solvent to secure it in position with a leakproof fit. Thereafter, the posts are soldered to the connector bars 22 and finally, the box is filled with a fluid synthetic resin cover 45 to protectively enclose the top surface of the bars 22. This cover resin 45 is of a selected type, such as tetra hydra furan, so that it will set up with a tight, leakproof fit, as illustrated at FIG. 18.

The box 38 holding the three bars is a longer member, and is a compound structure including the box itself and a pair of channels. This longer box overlies all six cells and its length is conveniently equal to the inside dimension of the body. It includes a thick floor structure 39' and sidewalls 40' and ends 41' substantially the same as heretofore described. The three metal connectors 22 are each embedded into the floor structure with only their top surfaces being exposed and with the holes 42' extending through them and through the floor of the box in a position to receive the several posts 21 when it is placed in the battery.

The channel structures, located at its inner side of the box, permit the outer cells and the intermediate cells to have individual fluid passageways which extend to outlets at the center of the battery. A first pair of opposing channels 46 is mounted alongside the box with its inner sidewall 40' forming one side of the channels. A common floor 47 and inner sidewall 48 complete the channels 46 and they are divided by a central transverse partition 49. Each extends a distance sufficient to permit its end to terminate at the outer partition walls 30 and the channels to discharge into the outer cells 20 of the battery. A second pair of shorter, opposing channels 50 is mounted alongside the first channels 46 with the inner wall 48 of the first channels forming one side of the second pair. A floor section 51 and an inner sidewall 52 complete the channels 50 and they are divided by a central partition 53. Each extends a distance sufficient to permit its end to terminate at the intermediate partition walls 30 and the channels to discharge in the intermediate cells 20, that is, the cells of the battery which lie adjacent to the outer cells.

The second row of notches 36 in the partitions 30 are arranged to receive this box-channel assembly, and the assembly is proportioned to lie in the notched row 36 with its top edge flush with the top surface plane of the body 25. Transverse rims 44' are arranged about this structure formed by the box 38 and the channels 46 and 50 as closely spaced pairs to embrace the sides of the partition walls 30 about the notches 36. Accordingly, in assembly of the battery, the box-channel unit may be dropped into position in the notched row 36 with posts 21 of the plates extending through the holes 42. The box-channel unit is then welded in place to the partition walls. Thereafter, the posts 21 are soldered to the connector bars and the box is filled with resin cover 45', as heretofore described.

The lid 26 is then ready to be mounted upon the top of the battery with the terminal posts 23 extending through the anchor lugs 24 in this lid. This lid is formed as a flat, rectangular slab having its underside a flat plane surface, adapted to rest upon the top edges of the body 25 and upon the top edges of the walls of the boxes and channels within it. To provide for a secure, leakproof fit when the lid is welded into position, each portion of the top edge of the body and of the components within it is embraced within channels formed by rims depending from the undersurface of the lid. These rims include a first rim 54 extending about the edge of the lid and being adapted to fit into an outwardly facing notch 55 about the top edge of the walls of the body 25. Additional rim portions 56, depending from the undersurface of this lid, parallel this outward rim and extend longitudinally and transversely across the surface of the lid as closely spaced pairs in a pattern which is complementary to the pattern of the flat surface formed by the upper edge of the partitions 30 and the boxes 37 and 38 and channels 46 and 50. With this arrangement, it is a simple matter to fill the channels formed by the pairs of rims 54 and 56 with a viscous adhesive and then merely place the lid upon the body of the battery and push it in position so that the adhesive will make a continuous, effective bond between the underside of the lid and all of the top edges it contacts.

The lid 26 includes a pair of depending bosses 57 which hold the anchor lugs 24 in a rigid manner as to keep these lugs and the terminal post members 23 which extend upwardly through them in a rigid position, when the posts are soldered into the lugs to form the final terminals. This will effectively protect the plate assemblies therebelow from abuse which often occurs when an operator is attaching or removing a battery cable from a terminal.

To complete the lid, a nave of six orifices 58 is located at its center in a symmetrical pattern which places one orifice above each of the four channels and an orifice above each of the two central wells. With an effective seal by the rims 44, 44', 54 and 56 of the boxes, channels and lids separating each cell, it is apparent that each orifice will provide the means of communication from each cell to the exterior of the battery.

The orifices 58 to the cells, arranged as a nave at the center of the lid, are closed by a single cap C, hereinafter described. To provide a structure suitable for manufacture by the injection of the plastic resin in the mold, these orifices are extended and enlarged within short tubular bosses 59 which upstand from the upper surface of the lid 26 in an integrated, reinforced array. This array thus provides a base for mounting a connector head 60 onto the lid, the connector head being necessary for the attachment of the closure cap C.

This connector head 60 is formed as a nave of six short tubular sections 61 in an integrated, reinforced array, in the same pattern as the orifices 58. A circular flange 62 traverses the sections near their center portion, so that a segment of each section 61 extends underneath the flange for connection to the orifices 58. This connection is effected by a circular lip 63 on the bottom of each tubular section 61 which fits onto the orifice enlargement of a boss 59. Accordingly, the connector head 60 is placed upon the bosses 59 and welded in position by a suitable adhesive or solvent, the same as heretofore described.

The circular flange 62 has a diameter somewhat in excess of the outer diameter of the nave of tubular sections 61 to provide a circumferential seat 64 at its upper surface whereon a ring gasket 65 is placed. This gasket 65 is formed as a rubber-like, acid resisting material and will be contacted by a mating surface on the closure cap for a tight, leakproof fit. To complete the head, an array of bayonet connector lugs 66 extend about the periphery of the flange for engagement with similar lugs on the cap C.

The cap C is formed as a short cylindrical wall 67 having an array of longitudinal gripping raises 68 about its periphery. This cylinder 67 has an inside diameter sized to receive the connector lugs 66 when it is lowered upon the head 60 and an array of complementary, spaced connector lugs 69 extend inwardly from the lower edge to complete the bayonet connection with the head by partial rotation of the cap. These lugs have inclined surfaces 70 opposing like surfaces 70' on the head lugs 66 to permit the cap to be tightened in place by turning, all in a common manner.

A circumferential shelf overhang 71 is within this cylinder and lies a short distance above the lugs. The width of this overhang is such as to accommodate an array of alternating block-out slots 72 and pockets 73 adjacent to the inner wall of the cylinder 67 and also to form a flat annular surface seat which registers with the gasket on the seat 64 of the head. The slots 72 are directly above the lugs 69 and correspond with the shape of the lugs 69 to permit die plungers in the forming mold to move downwardly from the top of the cap to facilitate forming the lugs. The pockets 73 are included to avoid regions of excess material thickness in the cap.

An inner cylindrical wall 74 of the shelf extends upwardly within the cap a distance sufficient to clear the tops of the tubular sections 61 of the head 60, as shown in broken lines at FIG. 10. Thence, a disc 75 extends across the cap to form the top of the closure. This disc 75 includes an upwardly extended, cylindrical socket 76 at its center. The body 77 of a cylindrical vent valve V fits into this socket 76, with its lower portion depending from the undersurface of the disc 75 to project into a pocket 78 within the nave of tubular sections 61 on the head.

This valve V is formed with an axially centered bottom inlet 79 which is normally closed by a ball 80, resiliently held in a normally closed position by a spring 81. The upper end of the cylindrical body 77 is castellated as at 82 to communicate with a passageway 83 across the top of the cap to one side thereof, wherefrom a resilient drain tube extends to drop over the side of the battery. It follows that, if this battery, when in use, is accidentally tipped, the acid liquid is not lost because the valve is normally closed. However, should the generation of hydrogen or other vapor occur when the battery is being charged or discharged, an excess pressure of the gas will open the valve to permit release thereof. When the battery is not in use or is being used under a normal load, the valve remains closed and prevents loss of water by evaporation, a feature which helps extend its life.

To complete the battery, an optional feature, an indicator float 85, may be placed in each cell before the lid 26 is affixed onto the body 25. These floats are formed as small, thin, rectangular tabs or thin discs of a brilliantly colored synthetic resin. They must have a selected density somewhat greater than that of water and such that, when placed in a sulphuric acid solution of the concentration found in a charged battery, they will float, but in a dilute sulphuric acid of a concentration such as found in a dead battery, they will sink. Such a tab may be placed in a side of the cell 20 in the small space between the body sidewall 28 and the end of the plate assembly P, as indicated in dotted outline at FIG. 1.

As a further feature of this battery, a small passageway 86 may be formed in the head to extend into one of the cells so that any moisture which may accumulate within the pocket 78 or elsewhere upon the head about the tubular section 61 when the cap is closed, may drain back into one of the cells of the battery.

We have now described our invention in considerable detail. However, it is to be recognized that others skilled in the art can build alternate and equivalent constructions which are nevertheless within the spirit and scope of our invention. Hence, we desire that our protection be limited, not by the constructions illustrated and described, but only by the proper scope of the appended claims.

We claim:

1. In a storage battery of the wet-cell type having a plurality of cells provided with plate assemblies with post members upstanding therefrom within the upper portion of the cells and comprising:
 a box-like container having partitions dividing the same into a plurality of cells with the upper rim of the container and the upper edges of the partitions lying in a common, flat plane and with notches formed in the upper edges of the partitions;
 a plurality of elongated boxes carrying post connector bars with openings in the floor thereof, said bars connecting the posts to the connectors, said boxes being positioned in said notches at the top of the partitions and extending into the adjacent cells and interconnecting the posts of the several plate assemblies;
 a flat surfaced lid closing the container and including therein a plurality of outlets, one for each cell, arranged thereon as a closely spaced nave; and
 channel means positioned within the battery and placing each cell in communication with its respective outlet.

2. In the storage battery defined in claim 1, wherein: said boxes are formed as elongated members having a floor section, side walls and end walls wherein said connector bars are embedded into the upper portion of the floor section with post openings extending therethrough, and with the upper surface of the connector bars being positioned substantially at the top surface of the floor section to facilitate soldering the connectors to the post when the boxes are set in place within the container; and
 a cover material effectively encapsulating the connectors within the boxes.

3. In the storage battery defined in claim 2, wherein: the said notches receive the respective boxes with a snug fit, embracing the sides and undersurface of the boxes, and with the top surface of the boxes being substantially flush with the top surface of the partition edges, whereby to permit the boxes to be welded in the partition notches with a leakproof fit at the sides and bottom thereof, and to permit the lid to be welded against the flat, upper surface of the container edges, partitions and boxes.

4. In the storage battery defined in claim 3, including: spaced ridges about the sides and bottom of the boxes engaging the edges of the partitions when the boxes are fitted into the partitions, whereby to facilitate welding the boxes in place with an adhesive.

5. In the storage battery defined in claim 1, wherein: said channel means are integral with a box structure to extend from one side thereof and wherein
 said notches, which receive the box structure, are sized to also receive said channel means.

6. In the storage battery defined in claim 5, wherein: the upper edges of said box and the upper edges of said channel means lie in the plane defined by the rim of the container and the top edges and partitions, whereby to permit the undersurface of the lid to lie flatly upon all of said surfaces.

7. In the storage battery defined in claim 6, wherein: the undersurface of the lid is formed with a series of longitudinal and transverse grooves in a configuration complementary to the top edges of the container structure, partitions, boxes and channels therein to facilitate a tight, leakproof weld of the lid thereto.

8. In the storage battery defined in claim 1, wherein: said nave of outlets is located substantially at the center of the battery, with selected outlets communicating directly with the cells at the center of the battery and with other outlets connecting with channel means extending to other cells at the ends of the battery.

9. In the storage battery defined in claim 1, wherein: the unit is formed as a six-cell battery, with an array of transverse partitions in the body, wherein said nave is located at the center of the battery with three outlets at one side of a central transverse plane of the battery and with three outlets at the other side, where two outlets in the nave communicate directly with centrally positioned cells;

a first passageway below each of two other outlets communicates with the outer cells; and a second passageway below each of the remaining two outlets communicates with the intermediate cells.

10. In the storage battery defined in claim 1, wherein: said outlet nave extends above the surface of the lid and includes a head having a circular, flanged portion with connective means about its periphery which receives a common closure means and a cap positioned thereon to close off the outlets.

11. In the storage battery defined in claim 10, including: a gasket means upon the head about the nave opening, which receives a rim of the cap to effect a leakproof closure thereof.

12. In the storage battery defined in claim 10, wherein said cap is positioned over the nave and held in position by the flange.

13. In the storage battery defined in claim 12, wherein the connecting means between the cap and the flange includes a quick connect bayonet joint.

14. In the storage battery defined in claim 12, wherein: said cap is sealed to the flange about the nave of openings, and a centrally located, normally closed valve in the cap is adapted to open under low pressure, to release fumes generated within the battery.

15. In the storage battery defined in claim 14, wherein said valve is formed within a cylindrical shell having an opening at the bottom thereof, a ball check therewithin and a passageway extending laterally therefrom adapted to discharge gases generated within the battery at a point remote from the cap.

References Cited

UNITED STATES PATENTS

| | | | |
|---|---|---|---|
| 1,416,327 | 5/1922 | Blair | 136—177 |
| 3,396,056 | 8/1968 | Gonnard | 136—134 XR |
| 3,397,089 | 8/1968 | Sasagawa et al. | 136—134 XR |

WINSTON A. DOUGLAS, Primary Examiner

D. L. WALTON, Assistant Examiner

U.S. Cl. X.R.

136—162, 166, 176, 178